(12) United States Patent
Sakellariadis et al.

(10) Patent No.: US 10,948,888 B2
(45) Date of Patent: Mar. 16, 2021

(54) SMART BUILDING DEVICE DISCOVERY AND CONTROL

(71) Applicant: Microsoft Technology Licensing, LLC, Redmond, WA (US)

(72) Inventors: Spyros Steven Sakellariadis, Bellevue, WA (US); Chris Neil Segura, Sammamish, WA (US); Trevor Anton Sodorff, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 15/907,681

(22) Filed: Feb. 28, 2018

(65) Prior Publication Data

US 2019/0265661 A1 Aug. 29, 2019

(51) Int. Cl.
*G05B 19/042* (2006.01)
*G06F 16/951* (2019.01)
*G05B 15/02* (2006.01)
*H04L 12/28* (2006.01)

(52) U.S. Cl.
CPC .......... *G05B 19/042* (2013.01); *G05B 15/02* (2013.01); *G06F 16/951* (2019.01); *H04L 12/2816* (2013.01); *G05B 2219/2642* (2013.01)

(58) Field of Classification Search
CPC . H04L 12/2803; H04L 43/08; H04L 43/0805; H04L 43/0811; H04L 43/10; H04L 45/26; H04L 12/2816; G06F 11/30; G06F 11/3048; G06F 11/34; G06F 16/951; G05B 15/02; G05B 19/042; G05B 2219/2642

USPC ................... 370/242, 248, 250, 255; 700/15
See application file for complete search history.

(56) References Cited

U.S. PATENT DOCUMENTS

2007/0069850 A1* 3/2007 Anderson, Jr. ........ G05B 15/02
340/3.51

OTHER PUBLICATIONS

Ji Eun Kim et al: "Seamless Integration of Heterogeneous Devices and Access Control in Smart Homes", Jun. 26, 2012 (Jun. 26, 2012), IEEE, 2012 Eighth International Conference on Intelligent Environments, pp. 206-213 (Year: 2012).*
Markus Jung et al: "A transparent IPv6 multi-protocol gateway to integrate Building Automation Systems in the Internet of Things", 2012, IEEE, 2012 IEEE International Conference on Green Computing and Communications, pp. 225-233 (Year: 2012).*

(Continued)

*Primary Examiner* — Scott B Christensen
(74) *Attorney, Agent, or Firm* — Holzer Patel Drennan

(57) ABSTRACT

Performing automated building control in a building. A method includes identifying a target maximum polling time defining an amount of time in which all building devices in a plurality of devices should be polled. Each of the devices in the plurality of devices is identified. For each device in the plurality of devices, queries are sent to the device. For each device in the plurality of devices, responses are received from the device. Based on the queries and the responses, a functional query frequency range is determined identifying a range of query frequencies at which queries can be made to each device such that each device functions within a predetermined criteria. Based on the target maximum polling time and the functional query frequency ranges, a device polling scheme is identified. The devices in the plurality of devices are polled according to the identified polling scheme.

21 Claims, 4 Drawing Sheets

(56) References Cited

OTHER PUBLICATIONS

Kim, "Seamless Integration of Heterogeneous Devices and Access Control in Smart Homes" (Kim), 2012 Eighth International Conference on Intelligent Environments (pp. 207-213), IEEE (Year: 2012).*

Jung, "A transparent IPv6 multi-protocol gateway to integrate Building Automation Systems in the Internet of Things" (Jung), 2012 IEEE International Conference on Green Computing and Communications, Internet of Things, and Cyber, Physical and Social Computing (pp. 225-233), IEEE (Year: 2012).*

Appelqvist et al. "Performance comparison of XHR polling, Long polling, Server sent events and Websockets", posted on Aug. 20, 2017 at <https://pdfs.semanticscholar.org/ed82/49c8eabaa5f93a9f8f190d30cafd9770ef6d.pdf> (Year: 2017).*

Kim, et al., "Seamless Integration of Heterogeneous Devices and Access Control in Smart Homes", In Proceedings of the 8th International Conference on Intelligent Environments, Jun. 26, 2012, pp. 206-213.

"International Search Report and Written Opinion Issued in PCT Application No. PCT/US19/018382", dated Jun. 7, 2019, 16 Pages.

* cited by examiner

400

402 Identify A Target Maximum Polling Time Defining An Amount Of Time In Which All Building Devices In A Plurality Of Devices Should Be Polled

404 Identify Each Of The Devices In The Plurality Of Devices

406 For Each Device In The Plurality Of Devices, Send A Set Of One Or More Queries To The Device

408 For Each Device In The Plurality Of Devices, Receive A Set Of One Or More Responses From The Device

410 Based On The Queries And The Responses, Determine A Functional Query Frequency Range Identifying A Range Of Query Frequencies At Which Queries Can Be Made To Each Device Such That Each Device Functions Within A Predetermined Criteria

412 Based On The Target Maximum Polling Time And The Functional Query Frequency Ranges, Identify A Device Polling Scheme

414 Poll The Devices In The Plurality Of Devices According To The Identified Polling Scheme

*FIG. 4*

SMART BUILDING DEVICE DISCOVERY AND CONTROL

BACKGROUND

Background and Relevant Art

Computers and computing systems have affected nearly every aspect of modern living. Computers are generally involved in work, recreation, healthcare, transportation, entertainment, building management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. These connections allow a computing system to access services at other computing systems and to quickly and efficiently receive application data from other computing systems. Some such network connections may be used to connect networks of sensors and control circuits together. One particular type of such a network can be found in the building control space.

For several decades, many commercial buildings have been built with a rich set of controllers, which may include sensors and/or controls, already embedded in building equipment like Variable Air Volume (VAV), chillers, power meters, temperature sensors, pressure sensors, intrusion and occupancy sensors, and the like. The sensors regularly take readings to generate data on the building environment, which data can be used as inputs for controls used to control the building equipment.

However, this rich set of building data is often currently unused or at least under-utilized for a number of reasons. For example, the protocols most smart building controllers use to communicate with each other are legacy protocols that were designed well before the advent of modern internet protocols, including cloud service based protocols. This makes it difficult to use these legacy controllers, which can be costly to replace with new controllers, with Internet of Things (IoT) and public/private cloud solutions where scale and interoperability are often important considerations.

In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Alternatively or additionally, private or third party solutions often keep building data in proprietary formats, or close-box solutions, making access to the data complex, and sharing the data between various systems difficult.

The subject matter claimed herein is not limited to embodiments that solve any disadvantages or that operate only in environments such as those described above. Rather, this background is only provided to illustrate one exemplary technological area where some embodiments described herein may be practiced.

BRIEF SUMMARY

One embodiment illustrated herein includes a method that may be practiced in a building control network. The method includes acts for performing automated building control in a building comprising smart environment devices configured to sense and control a building environment, but where the smart environment devices operate using different protocols. The method includes identifying a target maximum polling time defining an amount of time in which all building devices in a plurality of devices should be polled. The method further includes identifying each of the devices in the plurality of devices. The method further includes for each device in the plurality of devices, sending a set of one or more queries to the device. The method further includes, for each device in the plurality of devices, receiving a set of one or more responses from the device. The method further includes, based on the queries and the responses, determining a functional query frequency range identifying a range of query frequencies at which queries can be made to each device such that each device functions within a predetermined criteria. The method further includes, based on the target maximum polling time and the functional query frequency ranges, identifying a device polling scheme. The method further includes polling the devices in the plurality of devices according to the identified polling scheme.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4 illustrates a method of performing automated building control.

DETAILED DESCRIPTION

Figure 1:
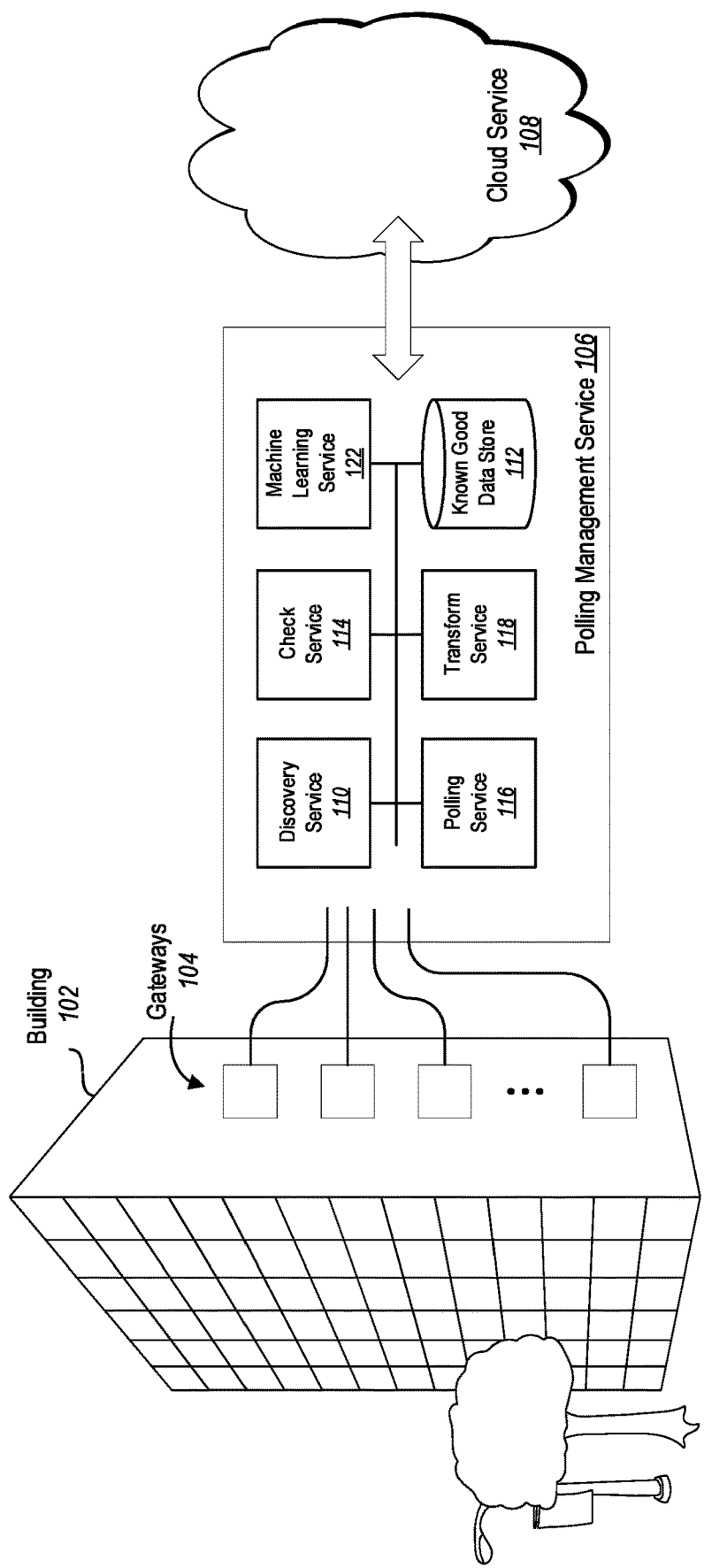
FIG. 1 illustrates a building, gateways, a policy management service, and a cloud service.

Some embodiments illustrated herein implement systems that are able to communicate with legacy and/or proprietary building controllers, including sensors (which monitor building environmental conditions) and/or controls (which adjust building equipment), to obtain and/or provide data natively, transform that data into data defined by modern and/or standardized protocols and to use that data in various building control scenarios. In some embodiments, this can be done to solve issues related to data that would otherwise be stranded in proprietary systems, or data that would otherwise not be accessible due to the legacy nature of the controllers and their associated protocols.

Using a device discovery and protocol translation service (an example of which is illustrated below as a polling management service), embodiments can auto-detect devices (including gateways and controllers), inventory devices, and create an on-premises "address book" which contains all the required information necessary to read sensor and control values and to send sensor and control commands to and from devices deployed in a smart building scenario. Once this address book is created and validated, embodiments can use the address book to poll smart building devices on a regular schedule, transform legacy and/or non-cloud friendly protocols into more modern IP based solutions. Such solutions may leverage interoperable JSON/Avro or other message formats to generate IP based messages. Embodiments can then wrap the IP based messages in cloud centric communication protocols like AMQP to send message data to a cloud network.

Thus, embodiments may include functionality for communicating with legacy/proprietary devices in their native protocol. For example, embodiments may include communication devices that communicate with the building sensors and control data using BACnet, a common building control protocol, directly. Embodiments may further include functionality for discovering and/or inventorying a smart building network, using the ability to communicate with building network devices natively, to build up an on premise "database", or "address book" which is used to facilitate various sensing and control processes. The address book contains a known-good list of known devices on the network and how to communicate with them. For example, the address book may include, for each device, a device ID, MAC address, acceptable packet lengths, acceptable polling frequency, etc. Note, that as used herein, polling includes one or both of requesting data from devices and providing data to devices.

Embodiments may be implemented that can read friendly device name strings which are used in building management systems to create load sheets. By automating this process, embodiments can simplify load sheet creation reducing load sheet creation time from, for example, several weeks, to a few days.

In summary, the address book can be used to control which smart building devices are polled and how often the smart building devices are polled.

The following illustrates an example process that can leverage the components described above for polling building devices. The polling process first sends a message to devices in their native language/protocol. Note that as used herein, devices include gateways and controllers. Controllers include at least one sensor and/or at least one control. Typically, messages are sent to gateways, which then forward appropriate messages to sensors and controls. The polling process then receives a response to that message from devices. Gateways receive data from sensors and controls and forward that data to external entities The polling process then translates that response message, which is in a proprietary and/or legacy protocol (e.g., BACnet), into a modern IP payload, such as an IoT payload (e.g., JSON, Avro,). The modern IP payload can then be wrapped into a cloud supported communication protocol (e.g., AMQP) and sent to a cloud network, such as IoT Hub. In some embodiments, the cloud network may be implemented using Microsoft Azure, available from Microsoft Corporation of Redmond, Wash.

Some embodiments may support a direct method for reading building devices. This method works as follows. Through one or more processes, e.g., data push, data pull, device provisioning, device Desired State Configuration (DSC), etc. an address book, with known good values, can be put on a gateway device and the gateway started automatically (locally or remotely) to use this database and begin immediate polling. The address book can be stored in the cloud and pushed to a gateway in the building. It could also be pre-provisioned on the gateway device at manufacturing time and thus just "exist" at the time the gateway device is unboxed and installed.

Figure 2:
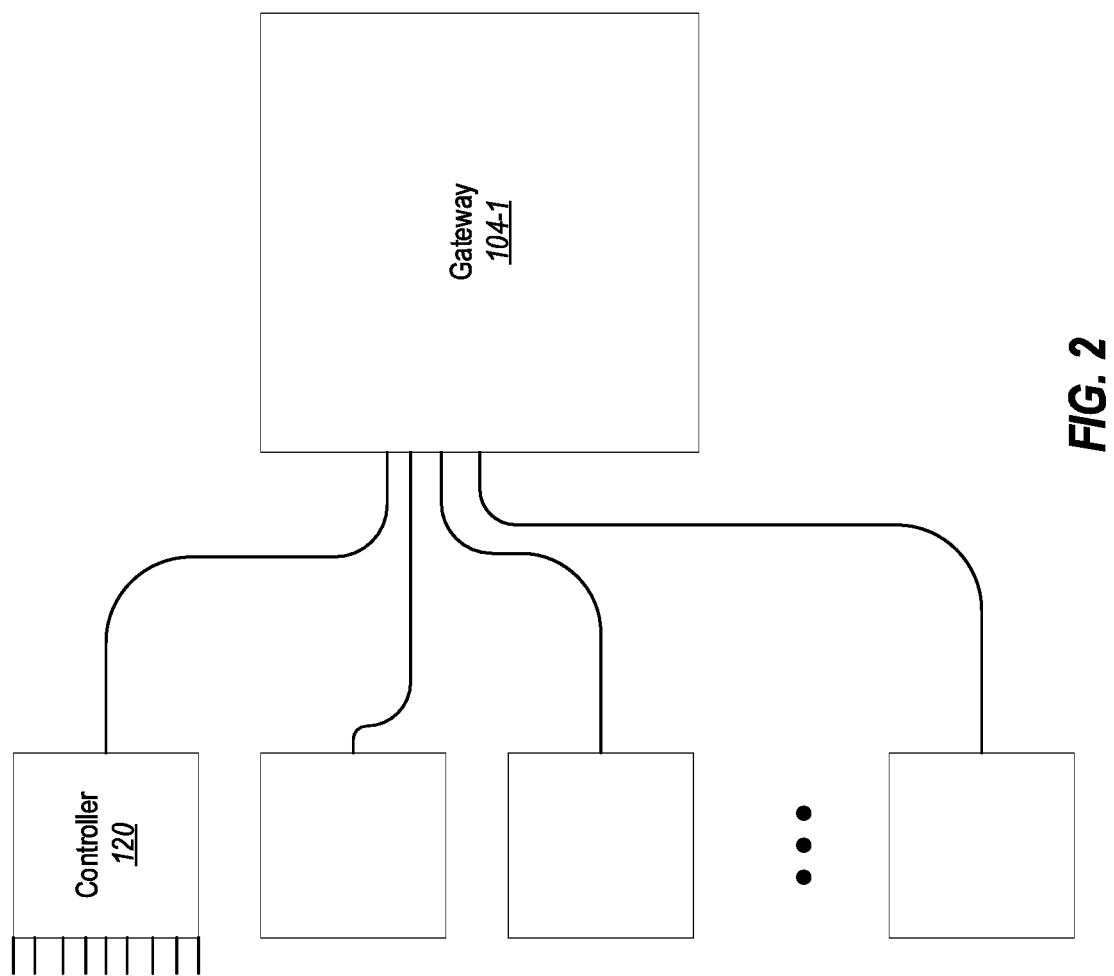
FIG. 2 illustrates a gateway coupled to a set of controllers.

Referring now to FIG. 1, an example illustrates an environment which includes a building 102. The building 102 includes a number of different controllers which include sensors and/or controls distributed throughout the building 102. For example, the building 102 may include controllers with one or more of temperature sensors, airflow volume sensors, lighting sensors, chilled water sensors, condenser sensors, pressure sensors, occupancy sensors, alarm sensors, automation sensors, etc. The building 102 may also include controllers with one or more actuator controls, fan controls, heater controls, alarm controls, door controls, etc. The controllers will be discussed in more detail below, and in particular, in conjunction with the discussion of FIGS. 2 and 3. FIG. 1 further illustrates a set of gateways 104. The gateways in the set of gateways 104 are each connected to one or more controllers. The gateways 104 are configured to query the controllers and to obtain data from the controllers. Additionally, the gateways 104 are configured to provide data to the controllers, such as control signals provided to controls. Typically, the gateways 104 are configured to use a particular type of protocol to communicate externally to the gateways 104. For example, the gateways 104 will obtain data from the sensors and provide the data to an external entity using some predetermined protocol. As discussed above, the predetermined protocol is often a legacy protocol that is not interoperable with modern-day IP protocols, or a proprietary protocol that requires specialized software or communication devices to interpret the data from the gateway.

However, FIG. 1 illustrates a polling management service 106. The polling management service 106 is configured to identify various gateways and controllers in the building 102. The polling management service 106 is further configured to implement a polling scheme to poll devices in the building 102 and to obtain data from those devices. As noted above, devices include gateways and controllers (including sensors and/or controls). The polling management service 106 is further configured to repackage data from the devices in the building 102 into an IP compliant protocol such that the data obtained from the devices in the building 102 can be provided to other entities which can implement building control schemes to control equipment (such as heaters, chillers, alarms, blowers, etc.) in the building 102. Note that while the polling management service 106 is illustrated external to the building 102 it should be appreciated that the polling management service 106 may also be implemented as part of a control facility inside of the building 102.

The polling management service 106 may be implemented as a special purpose hardware device with firmware or hardware configured to perform the functions of the polling management service 106. Alternatively or additionally, the polling management service 106 may be a part of a general purpose computing device configured with software to perform the functions of the polling management service 106. The polling management service 106 has various sub-services, as described below, which may be implemented using various combinations of hardware, firmware, and/or software.

FIG. 1 illustrates a cloud service 108. The cloud service 108 may be configured to receive data from the polling management service 106. The cloud service 108 can process the data from the polling management service 106 to determine various control actions to perform at the building 102. Alternatively or additionally, the cloud service 108 can collect data from the sensors in the building 102 and can assemble the data into various reports which can then be provided to various entities.

FIG. 1 illustrates that the polling management service 106 includes a number of other internal services. For example, the polling management service 106 may include a discovery service 110. The discovery service 110 includes functionality to discover various gateways, sensors, and controls in the building 102. For example, in some embodiments, this may be accomplished by the discovery service sending various messages on one or more computer communication network connections coupled to the gateways 104. For example, the discovery service 110 may send the various messages using various different protocols to attempt to identify gateways that are able to respond to the messages. Various different types of messages may be sent by the discovery service 110. For example, in some embodiments, the discovery service may send messages requesting information from the gateways 104. For example, the discovery service 110 may send a message requesting identification information. When the discovery service 110 sends a message of the appropriate protocol, and the gateway is configured to respond to the message, the gateway will return a response providing the requested information. This information can be stored in an appropriate data store as will be discussed in more detail below. The discovery service 110 may iteratively perform various discovery actions in an attempt to identify devices in the building 102. Thus for example, the discovery service 110 may send a number of different messages using different protocols to which various gateways are configured to respond in an attempt to identify all of the functioning devices in the building 102.

For example, the discovery service 110 may send a ping of a particular protocol to the control network in the building 102. A gateway configured to respond to the ping of the particular protocol will respond indicating its presence to the discovery service 110. The discovery service 110 will then begin interrogating any gateways that respond. For example, the discovery service 110 may query a gateway to ask what types of inputs and outputs are available on the gateway. Typically, these inputs and outputs, as will be discussed in more detail below, are a result of having controllers with sensors and controls having various inputs and outputs. Outputs may provide information received from sensors such as temperatures, air speeds, occupancy indications (e.g., detecting user presence in a space), alarm triggers, etc. These outputs are also discussed in more detail below. Inputs may be information that can be provided to controls such that the controls can control equipment in the building 102. For example, a controller may include an actuator input that allows the controller to receive information indicating that a control should open or close an actuator, such as to close a vent, a door, or some other closable item. Alternatively or additionally inputs may indicate to controls that a heater should be activated or deactivated. Alternatively or additionally inputs may indicate to controls that an alarm should be activated or deactivated. Alternatively or additionally inputs may indicate to controls that a blower should be activated or deactivated. Alternatively or additionally inputs may indicate to controls that a chiller should be activated or deactivated, etc. Thus, the discovery service 110 is able to collect information about gateways and controllers on the control network of the building 102.

As noted previously, this information is then stored in an appropriate data store. Note that in some embodiments, a generalized message is sent to the control network of the building 102 such that any device that understands the message will automatically respond to the message. However, as will be illustrated in more detail below, in some embodiments a message is directed to a particular device when some information is already known about that device, such as a network address, hardware address, or other particular identifier that can be used for the particular device.

In the example illustrated in FIG. 1, the polling and management service 106 includes a known good data store 112. The known good data store 112 is an example of the "address book" discussed above. The known good data store 112 may be any appropriate data store. For example, the known good data store 112 may be a database. In an alternative or additional embodiment, the known good data store 112 may be a flat file storing information. In some embodiments, the known good data store may be a file organized according to some schema, such as an XML schema or other appropriate schema. Alternatively or additionally, the known good data store 112 may be a spreadsheet. Note that in some embodiments, the known good data store 112 may resides in cloud storage and simply be pulled and/or queried at relevant times. The known good data store 112 contains information about devices in the building 102. As discussed previously herein, devices may include items such as gateways and controllers including sensors and controls. Thus, in some embodiments the known good data store 112 will contain an enumeration of any such devices that are known to exist in the building 102. In particular, the known good data store 112 will include an enumeration of gateways, and sensors and controls coupled to the gateways.

The enumeration included in the known good data store 112 can include a number of different elements. For example, in some embodiments, an entry in the known good data store 112 will include an identifier identifying a particular gateway. Such an identifier may be a globally unique identifier unique in the control network for the building 102. In some embodiments, the known good data store 112 will include an externally determined identifier, such as an IP address, hardware identifier such as a MAC address, or other appropriate externally determined identifier. The known good data store 112 can additionally include information identifying an appropriate protocol to use to communicate with a device. This information can be determined during discovery by the discovery service 110. In particular, the discovery service 110 knows what protocol is used to obtain information from devices, and can therefore associate that information about a device with the device along with information about the protocol used to obtain that information in the known good data store 112.

In some embodiments, as will be discussed in more detail below, the known good data store 112 may include information identifying the frequency at which communication can occur with devices. In particular, certain devices have a frequency range within which signals should be sent and/or received to and/or from the devices. In particular, if queries are made too frequently to a device, the device will not be able to provide data fast enough to respond to all of the queries sent to the device. Further, if queries are sent too infrequently to the device, the device may go to sleep, have a slow response time, or otherwise become unreachable. In some embodiments the device information is required at specific or particular frequencies to ensure critical events are not missed, or are well monitored. For example, with respect to building pressure, an over-pressurized or under-pressurized building is a safety concern. Monitoring pressure at regular, and relatively short (such as 5 min) intervals is a requirement of the scenario, not necessarily a device specific issue.

In some embodiments, the known good data store 112 may be constructed based on a previously provided device enumeration, such as a load sheet. In particular, when devices are first installed in the building 102, an enumeration is often generated identifying devices in the building 102. Many times, this enumeration is manually generated, in a load sheet, by engineers and technicians responsible for installing and maintaining the devices. Over time, this enumeration can become outdated. Alternatively or additionally, during the creation of the enumeration, various inaccuracies may occur. For example, an engineer or technician may identify an incorrect network address or hardware address for a device. Thus, in some embodiments, a check service 114 may be used to identify the accuracy of information about devices in the pre-existing enumeration. In particular, the check service 114 uses the enumeration details about devices in the enumeration to attempt to contact the devices to determine whether or not the devices exist on the control network in the building 102 and whether or not the information in the enumeration about the devices is correct. Thus, many of the entries in the known good data store 112 can be made based on this pre-existing enumeration with actions performed to ensure that the pre-existing enumeration contained accurate information while omitting inaccurate information from the enumeration. Note that in some embodiments, the check service 114 illustrated in FIG. 1 uses the information in the pre-existing enumeration to attempt to contact a gateway or attached controller. The gateway or attached controller may fail to respond. This failure to respond can be used by the check service 114 to determine that the presence of the gateway or controller is invalid. However, in some alternative embodiments, the check service 114 may be configured to attempt to identify the gateway or controller using an identifier that is similar to the one in the pre-existing enumeration under the assumption that the identifier in the pre-existing enumeration was either entered incorrectly (but that the incorrect entry is similar to the actual identifier of the device), updated over time, or for some other reason changed slightly from the identifier originally included in the pre-existing enumeration. For example, the device may have an identifier of 10.0.0.2, but an erroneous entry of 10.0.0.1 may be entered by a technician. Thus, the check service, when failing to contact the device at 10.0.0.1 may begin attempting to contact the device iteratively using proximate addresses and moving away from the entered address until some threshold address distance is reached. For example, the check service may be configured to check addresses up to a difference of 10 (in this case, up to 10.0.0.11). In the current example, the check service 114 will be able to contact the device at 10.0.0.2 in a single iteration. As noted above, the pre-existing enumeration may be a load sheet generated by a technician or engineer.

In some embodiments, in combination with using pre-existing enumeration to identify entries into the known good data store 112, embodiments may additionally use the discovery techniques discussed above, such as sending out a plurality of generalized requests using different protocols to identify other devices not included the pre-existing enumeration. In this way, a substantially complete listing of devices in the control network in the building 102 can be constructed and stored with appropriate information in the known good data store 112.

Additional details are now illustrated with respect to the gateways 104 and associated controls and sensors coupled to the gateways 104. For example, attention is now directed to FIG. 2 which illustrates a particular gateway 104-1. The gateway 104-1 in the illustrated example is coupled to a plurality of controllers 120 including sensors and/or controls. Sensors are devices that are able to detect certain environmental conditions. Controls are devices that are able to receive certain data or control voltages for controlling building equipment, such as heaters, blowers, alarms, chillers, etc. Sensors and controls are able to receive various combinations of analog inputs and digital inputs. Sensors and controls are further able to emit certain analog and digital outputs as will be discussed in more detail below.

Analog signals are signals that are interpreted in a continuously variable fashion where the magnitude of the signal, in some appropriate units, defines the value of the signal. Thus for example, an analog signal that is measured at 5.2 V has a value of 5.2. In contrast, digital signals are not interpreted in continuous fashion, but rather are interpreted as having two or more discrete values. Thus, the magnitude of the signal can be translated to the value. Thus for example, the majority of digital signals have two values, namely 0 and 1. If the voltage of a digital signal is below, for example, 1.5 V, then the digital signal will be interpreted as having a value of 0. In contrast, if the magnitude of the voltage of the digital signal is above 3.5 Volts, then the digital signal will be interpreted as having a value of 1.

Various sensors may be implemented in the control network of the building 102. As noted above, the sensors may have various inputs and outputs, such as various analog inputs and various analog outputs and various digital inputs and various digital outputs.

One example of a sensor may be a temperature sensor which measures temperature in an environment in the building 102. For example, such temperature sensors may measure the temperature of various occupancy spaces, such as offices, conference rooms, or other rooms in the building. Alternatively or additionally, such temperature sensors may measure the temperature of the equipment in the building 102. For example, temperature sensors could measure the temperature of heating devices, motors, or other devices in the building 102. Often, the output of these temperature sensors is an analog signal which can be translated to a temperature. For example, often the sensors will output current, such as a current in the range of 4 to 20 mA to indicate temperature being sensed by the temperature sensor. Alternatively or additionally, temperature sensor may output voltage, such as a voltage between the range of 0 to 10 V where the value of the voltage can be translated to a temperature. Alternatively or additionally, a temperature sensor may exhibit a certain impedance, such as resistance, based on the temperature being sensed by the temperature sensor. Similar sensors may be implemented for sensing humidity, air pressure or other pressures, airspeed, presence of contaminants or other substances (such as, for example, carbon monoxide sensors), etc.

Sensors may alternatively or additionally include digital outputs where digital signals indicate characteristics of the environment in which the sensors are implemented. For example, in some embodiments, a digital output may be provided which simply indicates whether or not the sensor is on or off. Alternatively or additionally, sensors may emit strings of digital outputs that can be interpreted to correspond to some particular value, such as temperature, pressure, occupancy, etc.

Sensors may alternatively or additionally include digital inputs. For example, some sensors may include a digital input that allows the sensor to be turned on or off. Alternatively or additionally, the sensors may allow for digital input which allows the sensor to be programmed to define how the sensor functions. Note that some sensors may include analog inputs alternatively or additionally to digital inputs. That is, a certain voltage or current input into the sensor may control how the sensor functions and how the sensor provides output.

Similarly, controls may have various combinations of analog input, analog output, digital input, and/or digital output. For example, certain voltages or currents may be sent to a control which will cause the control to control building equipment, such as heaters, chillers, blowers, alarms, etc. in a certain way dependent on the voltages or currents sent to the control.

Note that typically embodiments are implemented where the polling management service 106 communicates with gateway, such as the gateway 104-1 and the gateway 104-1 communicates with the sensors and controls. The gateway 104-1 will expose the sensors and controls to the polling management service 106 as a set of analog and/or digital inputs and/or outputs. Thus for example, the known good data store 112 may include an enumeration of gateways. The gateways in the enumeration of gateways may be correlated with inputs and outputs, where the inputs and outputs belong to sensors and/or controls coupled to the gateway.

Figure 3:
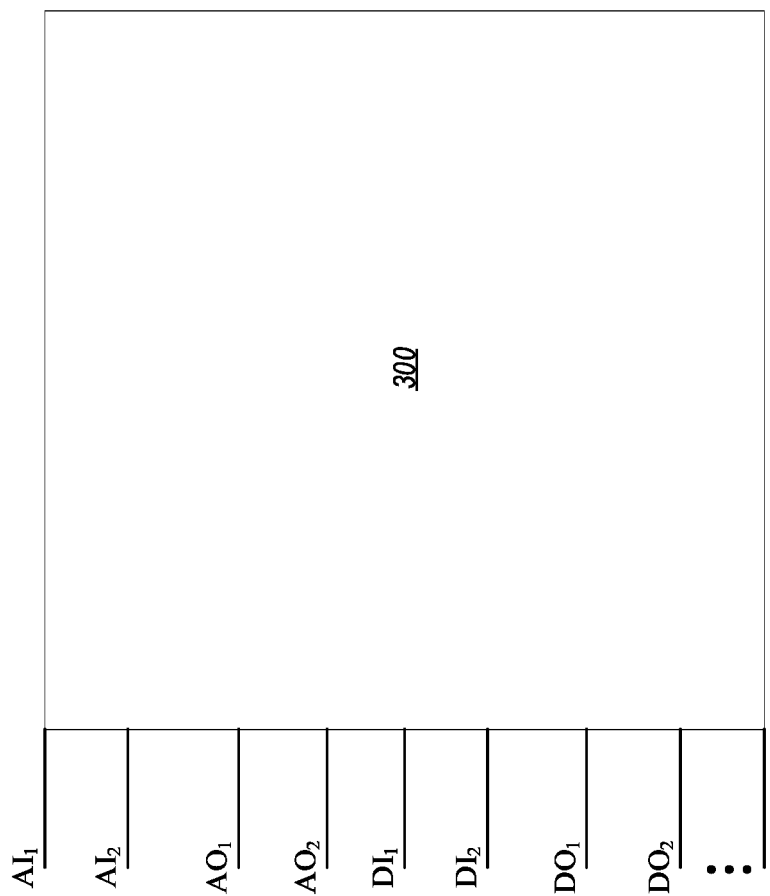
FIG. 3 illustrates a device including various inputs and outputs.

FIG. 3 illustrates an example of a device 300 which includes various analog input ($AI_j$), analog outputs ($AO_j$), digial inputs ($DI_j$) and digital outputs ($DO_j$).

In some embodiments, the known good data store 112 may be implemented number of tables. For example, in some embodiments the known good data store 112 may have a table that enumerates the various gateways in the control network of the building 102. This table may be linked to an additional table which includes an identification of controllers coupled to the gateways. In some embodiments, the controllers can be identified in the known good data store 112 as belonging to a subnet corresponding to a given gateway. Thus, individual controllers can be identified by the gateway to which they belong as well as a unique identifier within a subnet associated with the gateway.

In some embodiments of the invention, the discovery service 110 is configured to identify a functional query frequency range for each device. The functional query frequency range is a set of frequencies at which queries for polling can be sent to a device and still result in the device providing coherent data to the polling management service 106 in response. In particular, if queries are sent too frequently to a device, then the device may not have the capabilities to respond to the all of the queries as the device is physically not capable of responding quickly enough. This results in data being returned from devices that cannot be properly correlated with corresponding queries, resulting in incoherent data being returned from the devices. Alternatively, if polling queries are not sent frequently enough, then in some embodiments, devices may shut down or go to sleep such that they are unable to provide responses to polling queries. Alternatively or additionally, a device may not be queried often enough because of various cascading effects. For example, there may be too many devices, which cannot be polled too fast, but in aggregate all the device together have a query period too long for the safety scenario of the building. Thus, embodiments implement a window for a given device and optimize a query plan to make sure the safety scenario requirements are met. However, many embodiments are implemented where there is no lower limit to query frequency, meaning that the time period between queries can be long. However, practically all devices have a maximum query frequency, meaning there is a minimum amount of time between queries for the device to be able to return coherent data. Thus, in some embodiments, the functional query range may be limited to an upper frequency, and unlimited as to the lower frequency. Alternatively or additionally, the functional query range may be limited at both the upper and lower frequency values.

The discovery service 110 may be configured to accomplish this by sending queries at varying frequencies to devices, and in particular to gateways to determine a maximum (and potentially a minimum) frequency at which queries can be sent and coherent replies received. In some embodiments, this may be performed by sending differing queries to a device known to produce differing responses from the device. These queries can be sent at different rates, such as at increasing frequencies (or decreasing frequencies), until the device is no longer able to respond with coherent replies. In an alternative or additional embodiment, response time for a device may be selected for the device itself, such as iteratively shortened, until incoherent data is received. Thus, embodiments could simply request that the device itself respond back to a single query at various frequencies until the device itself fails to work. In some embodiments, a determination that a device is not able to respond with coherent replies may be determined by an error rate threshold. In particular, the device exhibits some predetermined error rate, then the device will be determined to no longer be able to reply coherently.

Referring once again to FIG. 1, a polling service 116 is illustrated. The polling service 116 is configured to poll devices on the control network in the building 102. In particular, the polling service 116 will attempt to obtain data to provide data to and/or from various sensors and to various controls in the building control network.

In some embodiments, it is important that polling take place within a predetermined time. For example, many systems require that polling occur for all devices in a building control network in a five minute timeframe. For example, temperature control that is performed less frequently than this can result in less than desirable living conditions. Thus, in some embodiments the polling service 116 is configured to poll all devices in the building control network within this predetermined time of five minutes. Embodiments may be specially implemented to allow all polling to take place within this predetermined time.

In some embodiments this may require implementing parallel components. For example, in some embodiments the polling management service 106 may be virtualized such that different instances of the polling management service 106 may be used poll different devices in the building control network. Thus for example, if it would require 10 minutes for a single instance of the polling management service 106 to poll all devices in the building control network, then in some embodiments two instances of the polling management service 106 may be implemented to ensure that all devices are polled within the five minute time limit. As noted previously, sometimes this may be accomplished by implementing virtualized polling management services that can be instantiated a number of times as needed. For example, in one embodiment, virtualization solutions available from Docker Inc. of San Francisco, Calif. may be used to implement a containerized virtualization system that can be used to implement multiple instances of the polling management service 106.

Alternatively or additionally, in some embodiments multithreaded execution may be used where different threads in the multithreaded execution simultaneously poll different portions of the building control network in that the different threads poll different devices on the building control network. As noted and intimated above, the selection of the number of threads used and/or the number of instances of the polling management service 106 may be determined based on the requirement to complete polling within the predetermined time.

In some embodiments, a polling scheme may be determined using the information in the known good data store 112 which identifies how frequently devices can be polled as well as information identifying how often devices should be polled. A polling scheme can be created such that devices are polled as frequently as they should be polled but are not polled at a rate exceeding a polling frequency range stored in the known good data store 112 for the devices. Thus a polling scheme can be created which instantiates a sufficient number of polling management service 106 instances and/or threads to be able to poll all of the devices in the control network building 102 in compliance with maximum and/or minimum pulling frequencies as well as within the predetermined time discussed above.

When the polling service 116 polls devices in the building control network, the devices will respond with certain data. As noted above, that data may be implemented in certain proprietary or legacy protocols that are less usable or unusable for other systems. Thus in the illustrated example, the polling management service 106 includes a transform service 118. The transform service 118 is configured to transform the data received from the polling performed by the polling service 116 into data usable by external entities such as the cloud service 108.

The cloud service 108 can then use the data to provide control signals, log data for the building control network, or other functions.

Note that the various services included in the polling management service 106 are modular. This means that each of the individual services can be updated individually rather than needing to update the polling management service 106 as a whole to update any of the individual services in the polling management service 106 individually.

The polling management service 106 may include other services not specifically illustrated herein. For example, in some embodiments, the polling management service 106 may include a machine learning service 122. The machine learning service may be configured to learn effective ways to control the building control network and to implement the learned knowledge to create a more efficient control system.

Thus, embodiments illustrated above may include functionality for converting legacy and/or proprietary smart building protocols into a modern, e.g., IoT, compatible data format. Embodiments may include functionality for automated discovery and/or validation of the legacy devices.

Embodiments may use the results of the discovery process to report device names and other information for use in creating and/or updating a building load sheet. Embodiments may use an onboard address book to store the results of the discovery process. Embodiments may use the onboard address book to create a list of objects to poll, store frequency of polling etc. Embodiments may facilitate remote management of this address book through cloud features like twin, device management, provisioning and direct methods. Twins are a digital representation in the cloud of a device. For example, if there is a desire to have a device with a specific set of firmware, software, state (e.g., time zone settings, etc.) in real life, embodiments could use a cloud "twin" to define what those settings look like and then when a real device comes online it can find it's cloud "twin" to help define what it should configure itself. Twins in this case can be used to define what version, location, type of address book, or and/or other information that the device should use and where to get it. Some embodiments may include functionality for starting of a gateway with a known good address book bypassing the need to discover a network on its own.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Referring now to FIG. 4, a method 400 is illustrated. The method 400 includes acts for performing automated building control in a building comprising smart environment devices configured to sense and control a building environment, but where the smart environment devices operate using different protocols. The method includes identifying a target maximum polling time defining an amount of time in which all building devices in a plurality of devices should be polled (act 402). For example, embodiments may determine an acceptable time to poll devices in a building. For example, this may be based on comfort of occupants of the building. Thus for example, some embodiments may wish to be able to activate heating or cooling within an acceptable amount of time such that occupants remain comfortable. Alternatively or additionally, the target maximum polling time may be based on an acceptable time for actuating alarms.

The method 400 further includes identifying each of the devices in the plurality of devices (act 404). For example, as discussed previously, various discovery methods can be used to identify various devices in the building control network. For example, embodiments may attempt to ping various devices in the building control network. Alternatively or additionally, embodiments may begin with a prepopulated list of devices and attempt to contact the devices in the pre-populated list to determine if those devices are actually in the building control network or not.

The method 400 further includes for each device in the plurality of devices, sending a set of one or more queries to the device (act 406). Various queries can be sent to devices. In some embodiments, queries can be sent to devices for which responses can be readily identified. Using these queries and responses a determination can be made as to whether or not coherent communication can be accomplished with the devices. In particular, in some embodiments, the queries can be sent at a particular rate.

The method 400 further includes for each device in the plurality of devices, receiving a set of one or more responses from the device (act 408). As intimated above, responses are received in response to the queries. In particular, attempts can be made to receive responses from the queries at the same rate, or a rate that allows for coherent communication, as the queries.

The method 400 further includes based on the queries and the responses, determining a functional query frequency range identifying a range of query frequencies at which queries can be made to each device such that each device functions within a predetermined criteria (act 410). For example, some embodiments may have a maximum error threshold. If queries and responses at a particular rate result in the maximum error threshold being exceeded, then it can be determined that the particular rate is too high for coherent communication. However, if queries at a particular rate result in responses having errors below the maximum threshold, then communication can be determined to be coherent such that the particular rate can be used for communicating with devices in the building control network. Alternatively or additionally, some embodiments may define a minimum data communication rate at which queries should be sent to devices in the building control network.

The method 400 further includes based on the target maximum polling time and the functional query frequency ranges, identifying a device polling scheme (act 412). For example, a polling scheme can be defined that can ensure that all devices are polled at a frequency in which they can communicate coherently, polled at a frequency where underlying purposes of the devices are met, polled at a frequency where the target maximum polling time can be accomplished, etc. in some embodiments, this may require the use of multiple different instances of polling entities. For example, in some embodiments, this can be accomplished by using a plurality of virtual machines where each virtual machine is able to poll devices in the building control network.

The method 400 further includes polling the devices in the plurality of devices according to the identified polling scheme (act 414).

The method 400 may be practiced where, for at least one device, the functional query range comprises sufficient time to obtain data from the device and push data back to the device. For example, in some embodiments, one polling sample is sometimes defined as including pushing data to a device and pulling data from the device or vice versa.

The method 400 may further include periodically identifying new devices in the plurality of devices; determining functional query frequency ranges for the new devices; updating the polling scheme in view of the new devices and functional query frequency ranges for the new devices; and polling the devices according to the updated polling scheme. In particular, embodiments may include functionality for adding and/or removing devices from the building control network. When new devices are added to the building control network, the devices can be identified and the polling scheme updated to ensure that coherent communication takes place between the polling management service 106 and other devices.

The method 400 may be practiced where, identifying each of the devices in the plurality of devices comprises: accessing a predefined enumeration of devices; attempting to contact the devices listed in the predetermined enumeration; and broadcasting queries to attempt to identify devices not included in the predetermined enumeration of devices. In some such embodiments, broadcasting queries in an attempt to identify devices not included in the predetermined enumeration of devices may include broadcasting queries using a plurality of different protocols.

The method 400 may further include converting one or more responses received from one or more devices from a non-cloud based or non-IoT based protocol message to a cloud based or IoT based protocol message.

The method 400 may further include converting one or more responses received from one or more devices from a proprietary protocol message to a standardized protocol message.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry the desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, but not limited to, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more processors; and
one or more computer-readable media having stored thereon instructions that are executable by the one or more processors to configure the computer system to perform automated building control in a building comprising smart environment devices configured to sense and control a building environment, the instructions being executable to configure the computer system to perform at least the following:
transmitting messages in a plurality of different protocols across a communications network to each of a plurality of devices in the building;
based on device responses received responsive to the transmission of the messages, identifying a protocol suitable for communicating with each of the plurality of devices and further identifying each of the plurality of devices as belonging to a device type category selected from a plurality of device type categories each being associated in memory with a specific desired maximum polling time, the specific desired maximum polling time representing a time interval in which it is desired to poll devices of the associated device type category at least once;
identifying, based on the desired maximum polling time for each device of the plurality of devices, a target maximum polling time defining a time interval in which it is desired for all building devices in the plurality of devices to be polled at least once;
for each device in the plurality of devices, sending a set of one or more queries to the device according to the identified protocol suitable for communicating with the device;
for each device in the plurality of devices, receiving a set of one or more responses from the device;
based on an error rate of the queries and the responses, to each of the plurality of devices, determining a functional query frequency range for each device in the plurality of devices, the functional frequency range identifying a range of query frequencies at which queries can be made to each device such that the device functions in accordance with predetermined performance criteria, the functional query frequency range bounded by a maximum polling frequency above which the device ceases to function in accordance with the predetermined performance criteria;
based on the target maximum polling time and the functional query frequency ranges, identifying a device polling scheme such that each device is polled at a frequency between a rate corresponding to the maximum polling time and the functional query range; and
polling the devices in the plurality of devices according to the identified polling scheme.

2. The computer system of claim 1, wherein for at least one device, the functional query range comprises sufficient time to obtain data from the device and push data back to the device.

3. The computer system of claim 1, wherein the one or more computer-readable media further have stored thereon instructions that are executable by the one or more processors to configure the computer system to perform at least the following:
periodically identifying new devices in the plurality of devices;
determining functional query frequency ranges for the new devices;
updating the polling scheme in view of the new devices and functional query frequency ranges for the new devices; and
polling the devices according to the updated polling scheme.

4. The computer system of claim 1, wherein identifying each of the devices in the plurality of devices comprises:
accessing a predefined enumeration of devices;
attempting to contact the devices listed in the predetermined enumeration; and
broadcasting queries in an attempt to identify devices not included in the predetermined enumeration of devices.

5. The computer system of claim 4, wherein broadcasting queries to attempt to identify devices not included in the predetermined enumeration of devices comprises broadcasting queries using a plurality of different protocols.

6. The computer system of claim 1, wherein the one or more computer-readable media further have stored thereon instructions that are executable by the one or more processors to configure the computer system to convert one or more responses received from one or more devices from a non-cloud based or non-IoT based protocol message to a cloud based or IoT based protocol message.

7. The computer system of claim 1, wherein the one or more computer-readable media further have stored thereon instructions that are executable by the one or more processors to configure the computer system to convert one or more responses received from one or more devices from a proprietary protocol message to a standardized protocol message.

8. The computer system of claim 1, wherein the plurality of device type categories include at least one of temperature-regulation devices and security devices.

9. A method of performing automated building control in a building comprising smart environment devices configured to sense and control a building environment, but where the smart environment devices operate using different protocols, the method comprising:
transmitting messages in a plurality of different protocols across a communications network to each of a plurality of devices in a building;
based on device responses received responsive to the transmission of the messages, identifying a protocol suitable for communicating with each of the plurality of devices and further identifying each of the plurality of devices as belonging to a device type category selected from a plurality of device type categories each being associated in memory with a specific desired maximum polling time, the specific desired maximum polling time representing a time interval in which it is desired to poll devices of the associated device type category at least once;
identifying, based on the desired maximum polling time for each device of the plurality of devices, a target maximum polling time defining a time interval in which it is desired for all building devices in the plurality of devices to be polled at least once;
for each device in the plurality of devices, sending a set of one or more queries to the device;
for each device in the plurality of devices, receiving a set of one or more responses from the device according to the identified protocol suitable for communicating with the device;
based on an error rate of the queries and the responses to each of the plurality of devices, determining a functional query frequency range for each device in the plurality of devices, the functional frequency range identifying a range of query frequencies at which queries can be made to each device such that each device functions in accordance with predetermined performance criteria, the functional query frequency range bounded by a maximum polling frequency above which the device ceases to function in accordance with the predetermined performance criteria;
based on the target maximum polling time and the functional query frequency ranges, identifying a device polling scheme such that each device is polled at a frequency between a rate corresponding to the maximum polling time and the functional query range; and
polling the devices in the plurality of devices according to the identified polling scheme.

10. The method of claim 9, wherein for at least one device, the functional query range comprises sufficient time to obtain data from the device and push data back to the device.

11. The method of claim 9, further comprising:
periodically identifying new devices in the plurality of devices;
determining functional query frequency ranges for the new devices;
updating the polling scheme in view of the new devices and functional query frequency ranges for the new devices; and
polling the devices according to the updated polling scheme.

12. The method of claim 9, wherein identifying each of the devices in the plurality of devices comprises:
accessing a predefined enumeration of devices;
attempting to contact the devices listed in the predetermined enumeration; and
broadcasting queries in an attempt to identify devices not included in the predetermined enumeration of devices.

13. The method of claim 12, wherein broadcasting queries to attempt to identify devices not included in the predetermined enumeration of devices comprises broadcasting queries using a plurality of different protocols.

14. The method of claim 9, further comprising converting one or more responses received from one or more devices from a non-cloud based or non-IoT based protocol message to a cloud based or IoT based protocol message.

15. The method of claim 9, further comprising converting one or more responses received from one or more devices from a proprietary protocol message to a standardized protocol message.

16. A building control system comprising:
a plurality of smart environment devices configured to sense and control a building environment, but where the smart environment devices operate using different protocols; and
a polling management service, wherein the polling management service is configured to perform the following:
transmitting messages in a plurality of different protocols across a communications network to each of a plurality of devices in a building;
based on device responses received responsive to the transmission of the messages, identifying a protocol suitable for communicating with each of the plurality of devices and further identifying each of the plurality of devices as belonging to a device type category selected from a plurality of device type categories each being associated in memory with a specific desired maximum polling time, the specific desired maximum polling time representing a time interval in which it is desired to poll devices of the associated device type category at least once;
identifying, based on the desired maximum polling time for each device of the plurality of devices, a target maximum polling time defining a time interval in which it is desired for all building devices in the plurality of devices to be polled at least once;
for each device in the plurality of devices, sending a set of one or more queries to the device according to the identified protocol suitable for communicating with the device;
for each device in the plurality of devices, receiving a set of one or more responses from the device;
based on an error rate of the queries and the responses to each of the plurality of devices, determining a functional query frequency range for each device in the plurality of devices, the functional frequency range identifying a range of query frequencies at which queries can be made to each device such that each device functions in accordance with predetermined performance criteria, the functional query frequency range bounded by a maximum polling frequency above which the device ceases to function in accordance with the predetermined performance criteria;

based on the target maximum polling time and the functional query frequency ranges, identifying a device polling scheme such that each device is polled at a frequency between a rate corresponding to the maximum polling tim and the functional query range; and polling the devices in the plurality of devices according to the identified polling scheme.

17. The building control system of claim 16, wherein for at least one device, the functional query range comprises sufficient time to obtain data from the device and push data back to the device.

18. The building control system of claim 16, wherein the polling management service is further configured to perform the following:

periodically identifying new devices in the plurality of devices;

determining functional query frequency ranges for the new devices;

updating the polling scheme in view of the new devices and functional query frequency ranges for the new devices; and polling the devices according to the updated polling scheme.

19. The building control system of claim 16, wherein identifying each of the devices in the plurality of devices comprises:

accessing a predefined enumeration of devices;

attempting to contact the devices listed in the predetermined enumeration; and broadcasting queries to attempt to identify devices not included in the predetermined enumeration of devices.

20. The building control system of claim 19, wherein broadcasting queries in an attempt to identify devices not included in the predetermined enumeration of devices comprises broadcasting queries using a plurality of different protocols.

21. The building control system of claim 16, wherein the polling management service is further configured to convert one or more responses received from one or more devices from a proprietary protocol message to a standardized protocol message.

* * * * *